(12) United States Patent
Seidel et al.

(10) Patent No.: US 6,737,454 B2
(45) Date of Patent: May 18, 2004

(54) IMPACT-RESISTANT POLY(ESTER) CARBONATE COMPOSITION

(75) Inventors: Andreas Seidel, Dormagen (DE); Thomas Eckel, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 52 days.

(21) Appl. No.: 10/245,446

(22) Filed: Sep. 17, 2002

(65) Prior Publication Data

US 2003/0114563 A1 Jun. 19, 2003

(30) Foreign Application Priority Data

Sep. 21, 2001 (DE) .......................... 101 46 697
Jun. 4, 2002 (DE) .......................... 102 24 616

(51) Int. Cl.$^7$ .............................. C08K 5/52; C08K 3/10
(52) U.S. Cl. .................. 524/127; 524/409; 524/413; 524/426; 524/427
(58) Field of Search ............... 524/127, 409, 524/413, 426, 427

(56) References Cited

U.S. PATENT DOCUMENTS

| | | | |
|---|---|---|---|
| 4,098,750 A | 7/1978 | Mark et al. | 260/30.8 R |
| 4,108,820 A | 8/1978 | Mark et al. | 260/30.8 R |
| 5,075,472 A | 12/1991 | Misra et al. | 556/179 |
| 6,103,827 A * | 8/2000 | Saito et al. | 525/148 |

FOREIGN PATENT DOCUMENTS

| | | |
|---|---|---|
| DE | 266 239 | 3/1989 |
| RU | 2058350 | 4/1996 |

OTHER PUBLICATIONS

Journal of Vinyl & Additive Technology, Jun. 1995, Issue 1, No. 2 pp. 94–97, John M. Stinson.
Patent Abstracts of Japan, vol. 017, No. 582 (C–1123), Oct. 22, 1993 & JP 05 170871 A (Matsushita Electric Works Ltd), Jul. 9, 1993.
Patent Abstracts of Japan, vol. 017, No. 582 (c–1123), Oct. 22, 1993 & JP 05 170870 A (Matsushita Electric Works Ltd), Jul. 9, 1993.

* cited by examiner

*Primary Examiner*—Kriellion A. Sanders
(74) *Attorney, Agent, or Firm*—Joseph C. Gil; Aron Preis; Gary F. Matz

(57) ABSTRACT

Impact-resistant polycarbonate and/or polyester carbonate compositions containing at least one oxalate compound selected from the group consisting of metal oxalates, metal hydroxy oxalates, oxalic acid esters and metal salts of oxalic acid esters in quantities of 0.1 to 5 parts by weight (based on 100 parts by weight of the total composition) display an advantageous combination of flow line strength and stress-cracking resistance on exposure to chemicals combined with high thermal stability and good processing properties and they are also flame-resistant.

23 Claims, No Drawings

IMPACT-RESISTANT POLY(ESTER) CARBONATE COMPOSITION

FIELD OF THE INVENTION

The invention relates to thermoplastic molding compositions and more particularly to impact-resistant poly(ester) carbonate compositions.

SUMMARY OF THE INVENTION

Impact-resistant poly(ester)carbonate composition containing at least one oxalate compound is disclosed. The oxalate is selected from the group consisting of metal oxalates, metal hydroxy oxalates, oxalic acid esters and metal salts of oxalic acid esters. The resulting composition is flame resistant and exhibits an advantageous combination of notched impact strength, stress-cracking resistance under the action of chemicals, heat resistance and weld line strength and good processing behavior.

BACKGROUND OF THE INVENTION

Impact-resistant modified polycarbonate compositions that have been rendered flameproof are known. As flame retardants there may be used, beyond halogen-containing substances, in particular phosphorus-containing compounds, and on a large industrial scale in particular aromatic phosphoric acid esters. Such compositions are described for example in EP-A 0 363 608 and EP-A 0 640 655.

Silicate materials such as talcum may be added to such impact-resistant modified polycarbonate compositions that have been rendered flameproof with phosphoric acid esters (see for example JP-A 11199768, WO 00/46298, EP-A 1 026 205) in order to improve the flameproofing properties. Nanoscale inorganic powders such as basic aluminium oxides may also be added for the same purpose (see for example U.S. Pat. No. 5,849,827). The compositions that are thus obtained are characterized by an insufficient weld line strength however.

The use of mineral flame retardants such as aluminium trihydroxide, magnesium dihydroxide or antimony trioxide in polymers is summarised for example in M. Weber, "Mineral Flame Retardants", Industrial Minerals, February 2000, pp.19 to 27. Such flame retardants are typically not used in polycarbonate and its blends. The most widely used mineral flame retardant, aluminium trihydroxide, has a comparatively low decomposition temperature of about 200° C. and is therefore unsuitable for polymers such as polycarbonate and polycarbonate blends that are produced or processed at a processing temperature of >200° C. For polymers with processing temperatures of >200° C. magnesium dihydroxide is therefore frequently used, which has a decomposition temperature of about 340° C. Magnesium dihydroxide has the disadvantage however that it is much more expensive than aluminium hydroxide and when used in polycarbonate and its blends leads, on account of its basic character, to the breakdown of the polymer.

An oxalate-modified aluminium hydroxide with a decomposition temperature of >330° C. and its use as a flame retardant in various polymer compositions is described in J. Stinson, W. Horn, "*Flame Retardant Performance of a Modified Aluminium Trihydroxide with Increased Thermal Stability*", Journal of Vinyl & Additive Technology, June 1995, Issue 1, No. 2, pp. 94–97. The described oxalate-modified aluminium hydroxide exhibits in concentrations of 50% to 60% in various polymers such as high-density polyethylene (HDPE), polyvinyl chloride (PVC), polypropylene (PP), polyethylene terephthalate (PET) etc., a good flameproofing action as evaluated by the UL-94 V test. Only in polycarbonate (PC) did the addition of oxalate-modified aluminium hydroxide fail to provide the desired improvement of the flameproofing in terms of UL-94 V.

The production and characterization of aluminium hydroxide-lithium oxalate compounds is furthermore known from U.S. Pat. No. 5,075,472.

In this specification it is mentioned that such compounds can be useful for rendering polymers flameproof.

WO 01/58999 describes polymer blends containing a phosphorus compound and oxalate salts, the oxalate salts being added in a quantity of up to 30 parts by weight. In the examples, polycarbonate/ABS compositions are described which contain 10 parts by weight of aluminium oxalate.

It has been found that oxalate compounds in quantities according to the present invention do not or hardly have any negative effects on the impact strength properties of the test specimens but have positive effects on the weld line strength and the ESC properties (stress-cracking behaviour on exposure to chemicals). For the purposes of a particularly balanced property profile with regard to impact strength, weld line strength and ESC behavior, the most preferred concentration range for the oxalate compound is 0.3 to 3.0% by weight, based on the total composition.

Particularly in the case of thin wall thicknesses ($\leq 1.2$ mm) the molding compositions have excellent flame resistance according to UL-94 V and excellent processability, i.e. in particular, good melt flowability.

DETAILED DESCRIPTION OF THE INVENTION

This object is achieved by an impact-resistant modified polycarbonate composition that contains at least one oxalate compound selected from the group comprising metal oxalates, basic metal oxalates (metal hydroxy oxalates), oxalic acid esters and metal salts of oxalic acid esters in quantities of 0.1 to 5 parts by weight (based on 100 parts by weight of the total composition).

A characteristic feature of the impact-resistant modified compositions according to the invention is that they contain at least one oxalate compound. Oxalate compounds according to the invention are for example metal oxalates, basic metal oxalates, all metal salts of oxalic acid as well as esters of oxalic acid and metal salts of such esters. The metal salts of oxalic acid and oxalic acid esters may be single, double, mixed and complex salts with one or more identical or different, ionic, covalently or complexly bound metals. The metal oxalates, basic metal oxalates and metal salts of oxalic acid esters used according to the invention may contain any suitable metals. Particularly suitable are metals of the $1^{st}$, $2^{nd}$ and $3^{rd}$ main groups of the Periodic Table. Most particularly preferred are aluminium, magnesium and/or lithium salts as well as mixed forms of these salts. Such metal oxalates and basic metal oxalates are generally known and are described in the literature, for example in "Ullmans Enzyklopädie der Technischen Chemie" $4^{th}$ Edition, Vol. 17, Verlag Chemie, Weinheim, 1979, p. 480 ff.

Metal oxalate compounds that may preferably be used according to the invention are described hereinafter under component D.

According to a preferred embodiment of the invention an impact-resistant modified polycarbonate composition is provided that contains, in addition to the metal oxalate compound, a phosphorus-containing flame retardant, for example an oligophosphate, as further flame retardant. A particularly good property profile of the polycarbonate composition is obtained by the combination of the two flame retardants.

The impact-resistant modified polycarbonate compositions according to the invention may contain in addition to metal oxalate compounds further thermoplastic polymers, in particular polyester carbonates, polyesters, graft copolymers and vinyl (co)polymers.

These constituents and further components that may be used in these compositions according to the invention are described by way of example hereinafter.

Component A

The composition according to the invention contains polycarbonate and/or polyester carbonate (referred to below as poly(ester)carbonate), preferably aromatic poly(ester)carbonate. Suitable aromatic polycarbonates and/or aromatic polyester carbonates of Component A according to the invention are known in the literature or may be produced by processes known in the literature such as interface polymerization or melt polymerization processes (for the production of aromatic polycarbonates see for example Schnell "Chemistry and Physics of Polycarbonates", Interscience Publishers, 1964 as well as DE-AS 1 495 626, DE-A 2 232 877, DE-A 2 703 376, DE-A 2 714 544, DE-A 3 000 610, DE-A 3 832 396; for the production of aromatic polyester carbonates see for example DE-A 3 077 934).

The production of aromatic polycarbonates may be carried out for example by reacting diphenols with carbonic acid halides, preferably phosgene, and/or with aromatic dicarboxylic acid dihalides, preferably benzenedicarboxylic acid dihalides, according to the interface process, optionally using chain terminators, for example monophenols and optionally using branching agents having functionality of three or more, for example triphenols or tetraphenols.

Diphenols for the production of the aromatic polycarbonates and/or aromatic polyester carbonates are preferably those of the formula (I)

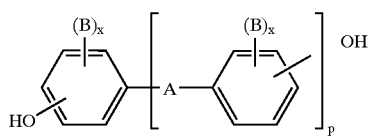

wherein

A denotes a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, to which further aromatic rings, optionally containing heteroatoms, may be condensed, or a radical of the formula (II) or (III)

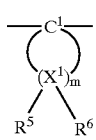

(II)

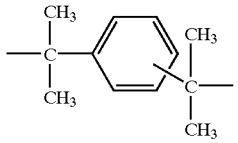

(III)

B in each case denotes $C_1$ to $C_{12}$-alkyl, preferably methyl, or halogen, preferably chlorine and/or bromine x in each case independently of one another denotes 0, 1 or 2, p is 0 or 1, and $R^5$ and $R^6$, independently of one another and individually selected for each $X^1$, denote hydrogen or $C_1$ to $C_6$-alkyl, preferably hydrogen, methyl or ethyl, $X^1$ is carbon and m is an integer from 4 to 7, preferably 4 or 5, with the proviso that on at least one atom $X^1$, both $R^5$ and $R^6$ are alkyl.

Preferred diphenols are hydroquinone, resorcinol, dihydroxy-diphenols, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones and α,α-bis-(hydroxyphenyl)-diisopropyl-benzenes as well as their nuclear-brominated and/or nuclear-chlorinated derivatives.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethyl-cyclohexane, 4,4'-dihydroxydiphenyl sulfide, 4,4'-dihydroxy-diphenyl sulfone as well as their dibrominated and tetrabrominated or chlorinated derivatives such as for example 2,2-bis(3-chloro-4-hydroxy-phenyl)-propane, 2,2-bis(3,5-dichloro-4-hydroxyphenyl)-propane or 2,2-bis(3,5-dibromo-4-hydroxyphenyl)-propane. Particularly preferred is 2,2-bis(4-hydroxyphenyl)-propane (bisphenol A).

The diphenols may be used singly or as mixtures. The diphenols are known in the literature or may be obtained by processes known in the literature.

Suitable chain terminators for the production of the thermoplastic, aromatic polycarbonates are for example phenol, p-chlorophenol, p-tert.-butylphenol or 2,4,6-tribromophenol, but also long-chain alkylphenols such as 4-(1,3-tetramethylbutyl)-phenol according to DE-A 2 842 005, or monoalkylphenol and/or dialkylphenols having a total of 8 to 20 carbon atoms in the alkyl substituents, such as 3,5-di-tert.-butylphenol, p-iso-octylphenol, p-tert.-octylphenol, p-dodecylphenol, and 2-(3,5-dimethylheptyl)-phenol and 4-(3,5-dimethylheptyl)-phenol. The amount of chain terminators to be used is between 0.5 mole % and 10 mole %, referred to the molar sum of the diphenols used in each case.

The thermoplastic, aromatic polycarbonates have weight average molecular weights ($M_w$, measured for example by ultracentrifugation or light-scattering measurements) of 10,000 to 200,000, preferably 15,000 to 80,000.

The thermoplastic, aromatic polycarbonates may be branched in a known manner, and more specifically preferably by the incorporation of 0.05 to 2.0 mole %, referred to the sum total of diphenols used, of trifunctional compounds or compounds of higher functionalities, for example those with three or more phenolic groups.

Both homopolycarbonates as well as copolycarbonates are suitable. For the production of copolycarbonates of component A according to the invention there may also be used 1 to 25 wt. %, preferably 2.5 to 25 wt. % referred to the total amount of diphenols used, of polydiorganosiloxanes with hydroxyaryloxy terminal groups. These are known (U.S. Pat. No. 3,419,634) and may be prepared according to processes known in the literature. The production of polydiorganosiloxane-containing copolycarbonates is described in DE-A 3 334 782.

Preferred polycarbonates are, in addition to bisphenol A homopolycarbonates, also the copolycarbonates of bisphenol A with up to 15 mole %, referred to the molar sums of diphenols, of diphenols other than the aforementioned preferred or particularly preferred diphenols, in particular 2,2-bis(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenylether-4,4'-dicarboxylic acid and naphthalene-2,6-dicarboxylic acid.

Particularly preferred are mixtures of the diacid dichlorides of isophthalic acid and terephthalic acid in a ratio between 1:20 and 20:1.

In the production of polyester carbonates a carbonic acid halide, preferably phosgene, is additionally co-used as bifunctional acid derivative.

Suitable chain terminators for the production of the aromatic polyester carbonates include, apart from the previously mentioned monophenols, also their chlorocarbonic acid esters as well as the acid chlorides of aromatic monocarboxylic acids that may optionally be substituted by $C_1$–$C_{22}$ alkyl groups or by halogen atoms, as well as aliphatic $C_2$–$C_{22}$ monocarboxylic acid chlorides.

The amount of chain terminators is in each case 0.1 to 10 mole %, referred in the case of phenolic chain terminators to moles of diphenol, and in the case of monocarboxylic acid chloride chain terminators, to moles of dicarboxylic acid dichlorides.

The aromatic polyester carbonates may also contain incorporated residues of aromatic hydroxycarboxylic acids.

The aromatic polyester carbonates may be linear as well as, in a known manner, branched (see in this connection DE-A 2 940 024 and DE-A 3 007 934).

As branching agents there may for example be used trifunctional or higher functional carboxylic acid chlorides such as trimesic acid trichloride, cyanuric acid trichloride, 3,3'-4,4'-benzophenone-tetracarboxylic acid tetrachloride, 1,4,5,8-naphthalenetetra-carboxylic acid tetrachloride or pyromellitic acid tetrachloride, in amounts of 0.01 to 1.0 mole % (referred to dicarboxylic acid dichlorides used) or trifunctional or higher functional phenols such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxy-phenyl)-benzene, 1,1,1-tri-(4-hydroxyphenyl)-ethane, tri-(4-hydroxyphenyl)-phenyl-methane, 2,2-bis[4,4-bis-(4-hydroxyphenyl)-cyclohexyl]-propane, 2,4-bis-(4-hydroxy-phenylisopropyl)-phenol, tetra-(4-hydroxyphenyl)-methane, 2,6-bis-(2-hydroxy-5-methylbenzyl)-4-methylphenol, 2-(4-hydroxyphenyl)-2-(2,4-dihydroxyphenyl)-propane, tetra-(4-[4-hydroxyphenyl isopropyl]-phenoxy)-methane, 1,4-bis-[4,4'-dihydroxytriphenyl)-methyl]-benzene, in amounts of 0.01 to 1.0 mole %, referred to the diphenols used. Phenolic branching agents may be added to the reaction vessel with the diphenols, and acid chloride branching agents may be added together with the acid dichlorides.

In the thermoplastic, aromatic polyester carbonates the proportion of carbonate structure units may vary as desired. Preferably the proportion of carbonate groups is up to 100 mole %, in particular up to 80 mole %, particularly preferably up to 50 mole %, referred to the sum total of ester groups and carbonate groups. Both the ester proportion as well as the carbonate proportion of the aromatic polyester carbonates may be present in the form of blocks or statistically distributed in the polycondensate.

The relative solution viscosity ($\eta_{rel.}$) of the aromatic polycarbonates and polyester carbonates is in the range from 1.18 to 1.4, preferably 1.20 to 1.32 (measured in solutions containing 0.5 g of polycarbonate or polyester carbonate in 100 ml of methylene chloride solution at 25° C.).

The thermoplastic, aromatic polycarbonates and polyester carbonates may be used alone or as mixtures of one with the other.

The component A may be contained in the compositions according to the invention in an amount of preferably 20 to 95 parts by weight, particularly preferably 30 to 90 parts by weight, most particularly preferably 40 to 80 parts by weight referred to the weight of the composition.

Component B

As impact modifier B the composition according to the invention may preferably contain one or more graft polymers of B.1 5 to 95 wt. %, preferably 20 to 90 wt. %, of at least one vinyl monomer grafted on B.2 95 to 5 wt. %, preferably 80 to 10 wt. %, of one or more graft bases having glass transition temperatures of <10° C., preferably <0° C., particularly preferably <−20° C.

The graft base B.2 generally has a median particle size ($d_{50}$ value) of 0.05 to 10 $\mu$m, preferably 0.1 to 5 $\mu$m, particularly preferably 0.2 to 1 $\mu$m.

Monomers B.1 are Preferably Mixtures of

B.1.1 50 to 99 parts by weight of vinyl aromatic compounds and/or nuclear-substituted vinyl aromatic compounds (such as for example styrene, α-methylstyrene, p-methylstyrene, p-chlorostyrene) and/or methacrylic acid ($C_1$–$C_8$) alkyl esters (such as methyl methacrylate, ethyl methacrylate) and B.1.2 1 to 50 parts by weight of vinyl cyanides (unsaturated nitriles such as acrylonitrile and methacrylonitrile) and/or (meth)acrylic acid ($C_1$–$C_8$)-alkyl esters (such as methyl methacrylate, n-butyl acrylate, tert.-butyl acrylate) and/or derivatives (such as anhydrides and imides) of unsaturated carboxylic acids (for example maleic anhydride and N-phenylmaleimide).

Preferred monomers B.1.1 are at least one of the monomers selected from the group consisting of styrene, α-methylstyrene and methyl methacrylate, and preferred monomers B.1.2 are at least one of the monomers acrylonitrile, maleic anhydride and methyl methacrylate.

Particularly preferred monomers are styrene (B.1.1) and acrylonitrile (B.1.2).

Suitable graft bases B.2 for the graft polymers B are for example diene rubbers, EP(D)M rubbers, i.e. those based on ethylene/propylene and optionally diene, acrylate, polyurethane, silicone, chloroprene and ethylene/vinyl acetate rubbers. Mixtures of the aforementioned rubbers are also suitable as graft base.

Preferred graft bases B.2 are diene rubbers (e.g. based on butadiene, isoprene) or mixtures of diene rubbers or copolymers of diene rubbers or their mixtures with further copolymerizable monomers (for example according to B.1.1 and B.1.2), with the proviso that the glass transition temperature of the component B.2 is below <10° C., preferably <0° C., particularly preferably <−10° C.

Pure polybutadiene rubber is particularly preferred.

Particularly preferred polymers B are for example ABS polymers (emulsion, bulk or suspension ABS), such as are described for example in DE-A 2 035 390 (=U.S. Pat. No. 3,644,574) or in DE-A 2 248 242 (=GB-PS 1 409 275) or in Ullmanns Enzyklopädie der Technischen Chemie, Vol. 19 (1980), p. 280 ff. The gel proportion of the graft base B.2 is at least 30 wt. %, preferably at least 40 wt. % (measured in toluene).

The graft copolymers B may be produced by free-radical polymerization, for example by emulsion, suspension, solution or bulk polymerization, preferably by emulsion or bulk polymerization.

Particularly suitable graft rubbers are also ABS polymers that are produced by redox initiation with an initiator system consisting of organic hydroperoxide and ascorbic acid according to U.S. Pat. No. 4,937,285.

Since in the grafting reaction the graft monomers are, as is known, not fully grafted onto the graft base, according to the invention graft polymers B are also understood to include those products that are obtained by (co) polymerization of the graft monomers in the presence of the graft base and that occur together with the products during the working-up.

Suitable acrylate rubbers according to B.2 of the polymers B are preferably polymers of acrylic acid alkyl esters, optionally with up to 40 wt. % referred to B.2 of other polymerizable, ethylenically unsaturated monomers. The preferred polymerizable acrylic acid esters include $C_1$ to $C_8$-alkyl esters, for example methyl, ethyl, butyl, n-octyl and 2-ethylhexyl esters, halogenalkyl esters, preferably halogen-$C_1$–$C_8$-alkyl esters such as chloroethyl acrylate, as well as mixtures of these monomers.

Monomers containing more than one polymerizable double bond may be co-polymerized for the crosslinking. Preferred examples of crosslinking monomers are esters of unsaturated monocarboxylic acids with 3 to 8 C atoms and unsaturated monohydric alcohols with 3 to 12 C atoms, or saturated polyols with 2 to 4 OH groups and 2 to 20 C atoms, such as ethylene glycol dimethacrylate, allyl methacrylate; multiply unsaturated heterocyclic compounds such as trivinyl cyanurate and triallyl cyanurate; polyfunctional vinyl compounds such as divinylbenzene and trivinylbenzene; and also triallyl phosphate and diallyl phthalate.

Preferred crosslinking monomers are allyl methacrylate, ethylene glycol dimethacrylate, diallyl phthalate and heterocyclic compounds containing at least three ethylenically unsaturated groups.

Particularly preferred crosslinking monomers are the cyclic monomers triallyl cyanurate, triallyl isocyanurate, triacryloylhexahydro-s-triazine, and triallylbenzenes. The amount of the crosslinking monomers is preferably 0.02 to 5 wt. %, in particular 0.05 to 2 wt. %, referred to the graft base B.2.

With cyclic crosslinking monomers containing at least three ethylenically unsaturated groups, it is preferred to restrict the amount to below 1 wt. % of the graft base B.2.

Preferred "other" polymerizable, ethylenically unsaturated monomers that apart from the acrylic acid esters may optionally serve for the production of the graft base B.2 are for example acrylonitrile, styrene, α-methylstyrene, acrylamides, vinyl $C_1$–$C_6$-alkyl ethers, methyl methacrylate, and butadiene. Preferred acrylate rubbers as graft base B.2 are emulsion polymers that have a gel content of at least 60 wt. %.

Further suitable graft bases according to B.2 are silicone rubbers with graft-active sites, such as are described in DE-A 3 704 657, DE-A 3 704 655, DE-A 3 631 540 and DE-A 3 631 539.

The gel content of the graft base B.2 is measured at 25° C. in a suitable solvent (M. Hoffmann, H. Krömer, R. Kuhn, Polymeranalytik I and II, Georg Thieme-Verlag, Stuttgart 1977).

The median particle size ($d_{50}$) is the diameter above and below which in each case 50 wt. % of the particles lie, and may be determined by means of ultracentrifuge measurements (W. Scholtan, H. Lange, Kolloid, Z. and Z. Polymere 250 (1972), 782–796).

The component B may be contained in the compositions according to the invention in an amount of preferably 1 to 40 parts by weight, particularly preferably 2 to 30 parts by weight, and most particularly preferably 3 to 25 parts by weight referred to the weight of the composition.

Component C

The composition according to the invention may contain as further component C one or more thermoplastic vinyl (co)polymers C.1 and/or polyalkylene terephthalates C.2.

Suitable as vinyl (co)polymers C.1 are polymers of at least one monomer from the group comprising vinyl aromatic compounds, vinyl cyanides (unsaturated nitriles), (meth)acrylic acid ($C_1$–$C_8$) alkyl esters, unsaturated carboxylic acids as well as derivatives (such as anhydrides and imides) of unsaturated carboxylic acids. Particularly suitable are (co)polymers of C.1.1 50 to 99 parts by weight, preferably 60 to 80 parts by weight of vinyl aromatic compounds and/or nuclear-substituted vinyl aromatic compounds such as for example styrene, α-methylstyrene, p-methylstyrene, p-chlorostyrene and/or methacrylic acid ($C_1$–$C_8$)-alkyl esters such as methyl methacrylate, ethyl methacrylate, and C.1.2 1 to 50 parts by weight, preferably 20 to 40 parts by weight of vinyl cyanides (unsaturated nitriles) such as acrylonitrile and methacrylonitrile and/or (meth)acrylic acid ($C_1$–$C_8$)-alkyl esters (such as methyl methacrylate, n-butyl acrylate, tert.-butyl acrylate) and/or unsaturated carboxylic acids (such as maleic acid) and/or derivatives (such as anhydrides and imides) of unsaturated carboxylic acids (for example maleic anhydride and N-phenyl-maleimide).

The (co)polymers C.1 are resinous, thermoplastic and rubber-free.

Particularly preferred is a copolymer of styrene (C.1.1) and acrylonitrile (C.1.2).

The (co)polymers according to C.1 are known and may be produced by free-radical polymerization, in particular by emulsion, suspension, solution or bulk polymerization. The (co)polymers preferably have molecular weights $M_w$ (weight average, determined by light scattering or sedimentation measurements) of between 15,000 and 200,000.

The polyalkylene terephthalates of the component C.2 are reaction products of aromatic dicarboxylic acids or their reactive derivatives such as dimethyl esters or anhydrides, and aliphatic, cycloaliphatic or araliphatic diols, as well as mixtures of these reaction products.

Preferred polyalkylene terephthalates contain at least 80 wt. %, preferably at least 90 wt. % referred to the dicarboxylic acid component, of terephthalic acid radicals, and at least 80 wt. %, preferably at least 90 mole %, referred to the diol component, of ethylene glycol radicals and/or butanediol-1,4 radicals.

The preferred polyalkylene terephthalates may in addition to terephthalic acid esters contain up to 20 mole %, preferably up to 10 mole %, of radicals of other aromatic or cycloaliphatic dicarboxylic acids with 8 to 14 C atoms or aliphatic dicarboxylic acids with 4 to 12 C atoms, such as radicals of phthalic acid, isophthalic acid, naphthalene-2,6-dicarboxylic acid, 4,4'-diphenyldicarboxylic acid, succinic acid, adipic acid, sebacic acid, azelaic acid or cyclohexanediacetic acid.

The preferred polyalkylene terephthalates may in addition to ethylene glycol radicals or butanediol-1,4 radicals contain up to 20 mole %, preferably up to 10 mole %, of other aliphatic diols with 3 to 12 C atoms or cycloaliphatic diols with 6 to 21 C atoms, for example radicals of propanediol-1,3, 2-ethylpropanediol-1,3, neopentyl glycol, pentanediol-1,5, hexanediol-1,6, cyclohexanedimethanol-1,4, 3-ethylpentanediol-2,4, 2-methylpentanediol-2,4, 2,2,4-trimethylpentanediol-1,3, 2-ethylhexanediol-1,3, 2,2-diethylpropanediol-1,3, hexanediol-2,5, 1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(4-β-hydroxyethoxyphenyl)-propane and 2,2-bis-(4-hydroxypropoxyphenyl)-propane (DE-A 2 407 674, 2 407 776, 2 715 932).

The polyalkylene terephthalates may be branched by incorporating relatively small amounts of trihydric or tetrahydric alcohols or tribasic or tetrabasic carboxylic acids, for example according to DE-A 1 900 270 and U.S. Pat. No. 3,692,744. Examples of preferred branching agents are trimesic acid, trimellitic acid, trimethylolethane and trimethylolpropane, and pentaerythritol.

Particularly preferred are polyalkylene terephthalates that have been produced solely from terephthalic acid and its reactive derivatives (e.g. its dialkyl esters) and ethylene glycol and/or butanediol-1,4, and mixtures of these polyalkylene terephthalates.

Preferred mixtures of polyalkylene terephthalates contain 1 to 50 wt. %, preferably 1 to 30 wt. %, of polyethylene terephthalate and 50 to 99 wt. %, preferably 70 to 99 wt. % of polybutylene terephthalate.

The polyalkylene terephthalates that are preferably used generally have an intrinsic viscosity of 0.4 to 1.5 dl/g, preferably 0.5 to 1.2 dl/g, measured in phenol/o-dichlorobenzene (1:1 parts by weight) at 25° C. in an Ubbelohde viscosimeter.

The polyalkylene terephthalates may be produced by known methods (see for example Kunststoff-Handbuch, Vol. VIII, p. 695 if, Carl-Hanser-Verlag, Munich 1973).

The component C may be contained in the compositions according to the invention in an amount of preferably 0 to 30 parts by weight, particularly preferably up to 25 parts by weight, and most particularly preferably up to 20 parts by weight, referred to the weight of the composition.

Component D

The suitable oxalate compounds D include metal oxalates, metal hydroxy oxalates, oxalic acid esters and metal salts of oxalic acid esters.

The production and properties of these compounds are known to the person skilled in the art and are described for example in U.S. Pat. No. 5,075,472, incorporated herein by reference.

Preferably a metal oxalate compound of the following general formula is used

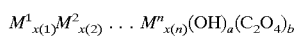

wherein n is a running index and $M^1$, $M^2$ to $M^n$ denote identical or different metals of the same or different valencies, the variable b denotes an arbitrary number >0, and the variables a and x(1) to x(n) denote arbitrary numbers ≧0, where at least one of the variables x(1) to x(n) has a value>0.

$M^1$ to $M^n$ are preferably selected from the group consisting of Li, Na, K, Rb, Cs, Be, Mg, Ca, Sr, Ba, B, Al, Ga, In and Tl. In particular $M^1$ to $M^n$ are selected from the group consisting of Al, Mg and Li. Preferably $M^1$ to $M^n$ are $Al^{3+}$ and/or $Mg^{2+}$ ions.

The ratio 2b/(a+2b) is preferably 0.1 to 1, in particular 0.2 to 0.5.

Preferably the metal oxalate compound is a compound of the aforementioned formula where $M^1$=Al, x(1)=1, x(2) to x(n)=0, a=2 and b=0.5.

Metal oxalate compounds that may be used according to the invention are for example also the aluminium hydroxide-lithium oxalate compounds described in U.S. Pat. No. 5,075,472 of the general formula

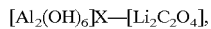

wherein X is 0.1 to 1. In particular the substances mentioned in the working examples of the '472 document are suitable for use in the composition according to the present invention. As regards the production and properties of the aluminium hydroxide/lithium oxalate compounds, reference should be made specifically to U.S. Pat. No. 5,075,472, the disclosure of which is incorporated by reference herein.

The metal oxalate compound preferably has a particle size of 0.05 to 50 μm, in particular 0.1 to 20 μm, particularly preferably 0.2 to 10 μm.

The oxalate compound, in particular the metal oxalate or the metal hydroxyoxalate, is furthermore preferably a compound that exhibits a weight loss of less than 5 wt. % at a temperature of 300° C. in the thermogravimetric analysis (TGA) measured dynamically in a nitrogen stream of 50 ml/min with a heating-up rate of 10 K/min.

According to a further preferred embodiment of the invention the oxalate compound, in particular the metal oxalate or metal hydroxyoxalate, is a compound that decomposes under the conditions mentioned above in the temperature range from 300° C. to 600° C. with the release of at least 30 wt. %, preferably at least 40 wt. %, of its weight of gases, in particular of non-combustible gases.

Oxalate compounds that may be used according to the invention are for example magnesium oxalate and oxalate-modified aluminium hydroxide (basic aluminium oxalate).

The metal oxalate compound is contained in the composition preferably in an amount of 0.1 to 5 parts by weight, in particular 0.1 to 4 parts by weight, particularly preferably 0.3 to 4 parts by weight, most particularly preferably 0.3 to 3 parts by weight, and most preferred of all 0.3 to 2 parts by weight, in particular 0.5 to 2 parts by weight referred to the weight of the composition.

Component E

The compositions may contain further flame retardants. By way of example halogenated compounds, in particular containing chlorine or bromine, as well as phosphorus-containing compounds may be mentioned as flame retardants. Also suitable are silicon-based compounds such as silicones or (alumino)silicates.

The compositions preferably include phosphorus-containing flame retardants such as monomeric and oligomeric phosphoric and phosphonic acid esters, phosphonatamines and phosphazenes, and mixture thereof. Other phosphorus compounds not specifically mentioned here may also be used alone or in any combinations with other flame retardants.

Preferred monomeric and oligomeric phosphoric acid esters and phosphonic acid esters are phosphorus compounds of the general formula (IV)

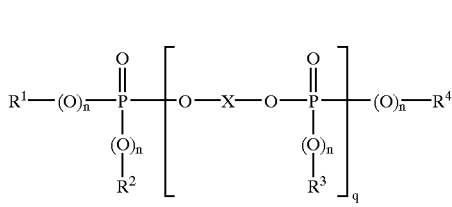

(IV)

wherein
- $R^1$, $R^2$, $R^3$ and $R^4$ independently of one another denote optionally halogenated $C_1$–$C_8$ alkyl, or $C_5$ to $C_6$ cycloalkyl, $C_6$ to $C_{20}$ aryl or $C_7$ to $C_{12}$ aralkyl in each case optionally substituted by alkyl, preferably $C_1$ to $C_4$ alkyl, and/or halogen, preferably chlorine or bromine,
- n independently of one another denotes 0 or 1
- q is 0 to 30, and
- X denotes a mononuclear or polynuclear aromatic radical with 6 to 30 C atoms, or a linear or branched aliphatic radical with 2 to 30 C atoms, which may be OH substituted and may contain up to 8 ether bonds.

Preferably $R^1$, $R^2$, $R^3$ and $R^4$ independently of one another denote $C_1$–$C_4$ alkyl, phenyl, naphthyl or phenyl-$C_1$–$C_4$-alkyl. The aromatic groups $R^1$, $R^2$, $R^3$ and $R^4$ may in turn be substituted by halogen and/or alkyl groups, preferably chlorine, bromine and/or $C_1$–$C_4$ alkyl. Particularly preferred aryl radicals are cresyl, phenyl, xylenyl, propylphenyl or butylphenyl, as well as the corresponding brominated and chlorinated derivatives thereof.

X in the formula (IV) preferably denotes a mononuclear or polynuclear aromatic radical with 6 to 30 C atoms, preferably derived from diphenols of the formula (I).

n in the formula (IV) independently of one another is 0 or 1, preferably equal to 1.

q denotes values from 0 to 30. When using mixtures of various components of the formula (IV), mixtures preferably where q averages 0.3 to 20, particularly preferably 0.5 to 10, most particularly preferably 0.5 to 6 and in particular 0.9 to 1.3 may be used.

X preferably denotes

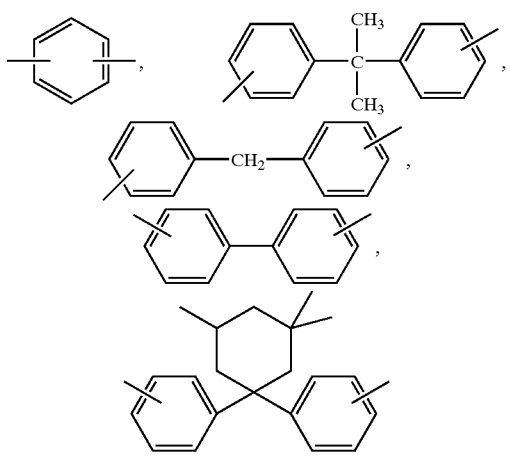

or their chlorinated or brominated derivatives, and X is in particular derived from resorcinol, hydroquinone, bisphenol A or diphenyl-phenol. Particularly preferably X is derived from bisphenol A.

Particularly preferred phosphorus-containing compounds are those of the formula (IVa)

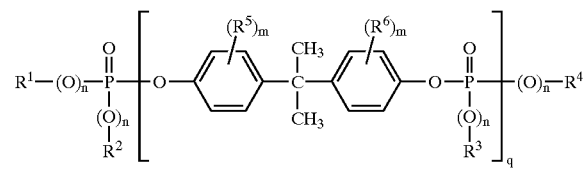

(IVa)

wherein
- $R^1$, $R^2$, $R^3$, $R^4$ and n have the meanings given for formula (IV),
- the m's independently of one another denote 0, 1, 2, 3 or 4, and preferably 0, 1 or 2,
- $R^5$ and $R^6$ independently of one another denote $C_1$ to $C_4$-alkyl, and preferably methyl or ethyl and
- q denotes 0.9 to 2, preferably 0.9 to 3 and particularly preferably 1 to 2.

As component E according to the invention there may be used monophosphates (q=0), oligophosphates (q=1–30) or mixtures of monophosphates and oligophosphates.

Monophosphorus compounds of the formula (IV) are in particular tributyl phosphate, tris-(2-chloroethyl)-phosphate, tris-(2,3-dibromopropyl)-phosphate, triphenyl phosphate, tricresyl phosphate, diphenylcresyl phosphate, diphenyloctyl phosphate, diphenyl-2-ethylcresyl phosphate, tri-(isopropylphenyl)-phosphate, halogen-substituted aryl phosphates, methylphosphonic acid dimethyl ester, methylphosphenic acid diphenyl ester, phenylphosphonic acid diethyl ester, triphenylphosphine oxide or tricresylphosphine oxide.

The phosphorus compounds that are suitable as component E and conform to formula (IV) are known (see for example EP-A 0 363 608, EP-A 0 640 655) and may be prepared according to known methods (see for example Ullmanns Enzyklopädie der Technischen Chemie, Vol. 18, p. 301 ff. 1979; Houben-Weyl, Methoden der Organischen Chemie, Vol. 12/1, p. 43; Beilstein Vol. 6, p.177).

The mean q values may be calculated by determining the composition of the phosphate mixture (molecular weight distribution) by means of suitable methods (gas chromatography (GC), high pressure liquid chromatography (HPLC), gel permeation chromatography (GPC)), and calculating therefrom the mean values for q.

Phosphonatamines, preferably compounds conforming to formula (V)

$$A_{3-y}\text{—NB}^1{}_y \quad (V)$$

in which
A denotes a radical of the formula (Va)

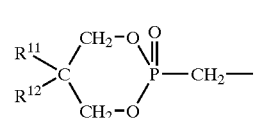

(Va)

or

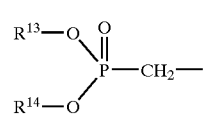

(Vb)

where $R^{11}$ and $R^{12}$ independently of one another denote unsubstituted or substituted $C_1$ to $C_{10}$ alkyl or unsubstituted or substituted $C_6$ to $C_{10}$ aryl, $R^{13}$ and $R^{14}$ independently of one another denote unsubstituted or substituted $C_1$ to $C_{10}$ alkyl or unsubstituted or substituted $C_6$ to $C_{10}$ aryl, or $R^{13}$ and $R^{14}$ together denote unsubstituted or substituted $C_3$ to $C_{10}$ alkylene, y denotes the numerical values 0, 1 or 2, and $B^1$ independently denotes hydrogen, optionally halogenated $C_2$ to $C_8$ alkyl, unsubstituted or substituted $C_6$ to $C_{10}$ aryl.

$B^1$ preferably independently denotes hydrogen, ethyl, n-propyl or iso-propyl, which may be substituted by halogen, or unsubstituted $C_6$ to $C_{10}$ aryl or $C_6$ to $C_{10}$ aryl substituted by $C_1$ to $C_4$ alkyl and/or halogen, in particular phenyl or naphthyl.

Alkyl in $R^{11}$, $R^{12}$, $R^{13}$ and $R^{14}$ independently preferably denotes methyl, ethyl, n-propyl, iso-propyl, n-, iso-, sec.- or tert.-butyl, pentyl or hexyl.

Substituted alkyl in $R^{11}$, $R^{12}$, $R^{13}$ and $R^{14}$ independently preferably denotes $C_1$ to $C_{10}$ alkyl substituted by halogen, in particular singly or doubly substituted methyl, ethyl, n-propyl, iso-propyl, n-, iso-, sec.- or tert.-butyl, pentyl or hexyl.

$C_6$ to $C_{10}$ aryl in $R^{11}$, $R^{12}$, $R^{13}$ and $R^{14}$ independently preferably denotes phenyl, naphthyl or binaphthyl, in particular o-phenyl, o-naphthyl or o-binaphthyl, which may be substituted by halogen (in general singly, doubly or triply substituted).

$R^{13}$ and $R^{14}$ may together with the oxygen atoms to which they are directly bound and the phosphorus atom, form a ring structure.

The following compounds may be mentioned by way of example and are preferred: 5,5,5',5',5",5"-hexamethyltris(1,3,2-dioxaphosphorinanemethane)amino-2,2',2"-trioxide of the formula (Va-1)

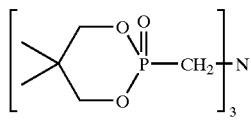

(Va-1)

(experimental product XPM 1000, Solutia Inc., St Louis, USA), 1,3,2-dioxaphos-phorinane-2-methanamine, N-butyl-N[(5,5-dimethyl-1,3,2-dioxaphosphorinan-2-yl)methyl]-5,5-dimethyl-, P,2-dioxide; 1,3,2-dioxaphosphorinane-2-methanamine, N-[(5,5-dimethyl-1,3,2-dioxaphosphorinan-2-yl)methyl]-5,5-dimethyl-N-phenyl-, P,2-dioxide; 1,3,2-dioxaphosphorinane-2-methanamine, N, N-dibutyl-5,5-dimethyl-, 2-oxide, 1,3,2-dioxaphosphorinane-2-methanimine, N[(5,5-dimethyl-1,3,2-dioxaphosphorinan-2-yl)methyl]-N-ethyl-5,5-dimethyl-, P,2-dioxide, 1,3,2-dioxaphos-phorinane-2-methanamine, N-butyl-N-[(5,5-dichloromethyl-1,3,2-dioxaphosphorinan-2-yl)-methyl]-5,5-dichloromethyl-, P,2-dioxide, 1,3,2-dioxaphosphorinane-2-methanamine, N[(5,5-dichloromethyl-1,3,2-dioxaphosphorinan-2-yl)-methyl]-5,5-di-chloromethyl-N-phenyl-, P,2-dioxide; 1,3,2-dioxaphosphorinane-2-methanamine, N, N-di-(4-chlorobutyl )-5,5-dimethyl-2-oxide; 1,3,2-dioxaphosphorinane-2-meth-animine, N[(5,5-dimethyl-1,3,2-dioxaphosphorinan-2-yl)-methane]-N-(2-chloroethyl)-5,5-di(chloromethyl)-, P,2-dioxide.

Also preferred are:
compounds of the formulae (Va-2) or (Va-3)

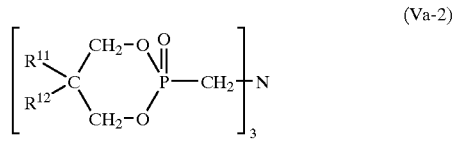

(Va-2)

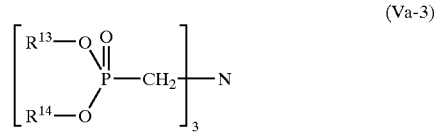

(Va-3)

wherein $R^{11}$, $R^{12}$, $R^{13}$ and $R^{14}$ have the meanings given above.

Particularly preferred are compounds of the formulae (Va-2) and (Va-1).

The preparation of the phosphonatamines is described for example in U.S. Pat. No. 5,844,028.

Phosphazenes conforming to formulae (VIa) and (VIb) are also suitable:

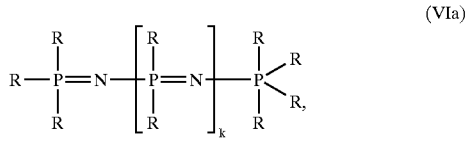

(VIa)

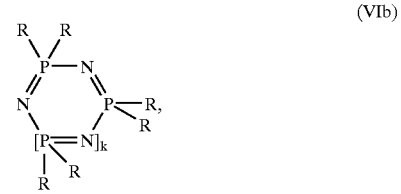

(VIb)

wherein

R in each case is identical or different and denotes amino, $C_1$ to $C_8$ alkyl or $C_1$ to $C_8$ alkoxy in each case optionally halogenated, preferably by fluorine, or $C_5$ to $C_6$ cycloalkyl in each case optionally substituted by alkyl, preferably $C_1$ to $C_4$ alkyl, and/or by halogen, preferably chlorine and/or bromine, or $C_6$ to $C_{20}$ aryl, preferably phenyl or naphthyl, $C_6$ to $C_{20}$ aryloxy, preferably phenoxy, naphthyloxy, or $C_7$ to $C_{12}$ aralkyl, preferably phenyl-$C_1$-$C_4$-alkyl, k denotes 0 or a number from 1 to 15, preferably a number from 1 to 10.

Propoxyphosphazene, phenoxyphosphazene, methylphenoxyphosphazene, aminophosphazene and fluoroalkylphosphazenes may be mentioned by way of example. Phenoxyphosphazene is particularly preferred.

The phosphazenes may be used alone or as a mixture. The radicals R may be identical one to the others or two or more radicals in the formulae (VIa) and (VIb) may be different.

Phosphazenes and their preparation are described for example in EP-A 0 728 811, DE-A 1961668 and WO 97/40092.

The flame retardants may be used alone or in arbitrary mixtures with one another or mixed with other flame retardants.

The component E may be contained in the composition according to the invention in an amount of preferably 0.5 to 30 parts by weight, particularly preferably 1 to 25 parts by weight and most particularly preferably 2 to 20 parts by weight, referred to the weight of the composition.

Component F

The flame retardant(s) used according to the invention may be employed in combination with so-called anti-drip agents, which reduce the tendency of the material to form burning droplets in the event of a fire. By way of example there may be mentioned here compounds from the classes of substances comprising fluorinated polyolefins, silicones as well as aramide fibres. These may also be used in the compositions according to the invention. Fluorinated polyolefins are preferably used as anti-drip agents.

Fluorinated polyolefins are known and are described for example in EP-A 0 640 655. They are marketed under the trade name Teflon® 30N by DuPont.

The fluorinated polyolefins may be used in pure form as well as in the form of a coagulated mixture of emulsions of the fluorinated polyolefins with emulsions of the graft polymers (component B) or with an emulsion of a copolymer, preferably based on styrene/acrylonitrile, in which the fluorinated polyolefin is mixed as an emulsion with an emulsion of the graft polymer or copolymer and is then coagulated.

Furthermore the fluorinated polyolefins may be used as pre-compound with the graft polymer (component B) or with a copolymer, preferably based on styrene/acrylonitrile. The fluorinated polyolefins are mixed as a powder with a powder or granules of the graft polymer or copolymer and are compounded in the melt in general at temperatures of 200° to 330° C. in conventional equipment such as internal kneaders, extruders or double-shaft screw extruders.

The fluorinated polyolefins may also be used in the form of a master batch that is produced by emulsion polymerization of at least one monoethylenically unsaturated monomer in the presence of an aqueous dispersion of the fluorinated polyolefin. Preferred monomer components are styrene, acrylonitrile and their mixtures. The polymer is used, after acidic precipitation and subsequent drying, as a free-flowing powder.

The coagulates, pre-compounds or master batches normally have solids contents of fluorinated polyolefin of 5 to 95 wt. %, preferably 7 to 70 wt. %.

Fluorinated polyolefins may be contained in the compositions in amounts of for example 0.05 to 5 parts by weight, preferably 0.1 to 1 part by weight and particularly preferably 0.1 to 0.5 part by weight referred to the weight of the composition.

Component G—Further Additives

The compositions according to the invention may further contain at least one of the conventional additives known for their utility in thermoplastic molding compositions such as lubricants and mold release agents, for example pentaerythritol tetrastearate, nucleating agents, antistatics, stabilizers, for example those based on phosphites, fillers and reinforcing substances such as glass fibers or carbon fibers, talcum, Wollastonite, mica, kaolin, $CaCO_3$ and glass chips, as well as dyes and pigments.

The compositions according to the invention may furthermore contain very finely particulate inorganic powders, such as are described for example in U.S. Pat. No. 5,849,827.

All indicated amounts in terms of parts by weight in this specification are such that the sum total of the parts by weight of all components in the composition is 100.

The compositions according to the invention are produced by mixing the respective constituents in a known manner and then melt-compounding and melt-extruding the latter at temperatures of 200° C. to 300° C. in conventional equipment such as internal kneaders, extruders and double-shaft screw extruders.

The mixing of the individual constituents may be carried out in a known manner both successively as well as simultaneously, and more specifically at about 20° C. (room temperature) as well as at higher temperatures.

The compositions according to the invention may be used to produce all types of molded articles. These may be produced by injection molding, extrusion and blow molding processes. A further form of processing is the production of molded articles by thermoforming from previously produced films or sheets.

Examples of such molded articles are sheets, profiled sections, all types of housing parts, e.g. for domestic appliances such as juice presses, coffee-making machines, mixers; for office equipment such as notebooks, telecommunications equipment, monitors, printers, copiers; sheeting, tubing, electrical installation ducting, windows, doors and further profiled sections for the building and construction sector (internal and external uses), as well as electrical and electronics parts such as switches, plugs and sockets.

In particular the compositions according to the invention may for example also be used to produce the following molded articles or molded parts:

Removable internal parts for tracked vehicles, boats, aircraft, buses and other vehicles, removable bodywork parts in the automotive sector, housings for electrical equipment containing small transformers, housings for equipment for information processing and transmission, housings and casings for medical equipment, massage equipment and housings therefor, children's toys, two-dimensional wall elements, housings for safety devices, thermally insulated transportation containers, devices for holding or looking after small animals, molded parts for sanitary ware and bathroom fittings, cover gratings for ventilator openings, molded parts for garden sheds and equipment housings, housings for gardening tools, and gardening and camping articles.

The invention furthermore relates to the use of oxalate compounds, in particular those selected from the group comprising metal oxalates, basic metal oxalates (metal hydroxy oxalates), oxalic acid esters and metal salts of oxalic acid esters, for the flameproofing of impact-resistant modified polycarbonate and/or polyester carbonate compositions.

Within the context of the present invention flameproofing is understood to denote in particular:

a) a reduction of the afterburning time in standardised flameproofing tests such as for example those according to UL 94 V or UL 94 5V and/or b) a reduction in the tendency to form droplets of burning materials and/or c) a reduction in the tendency to form perforations in two-dimensional test bodies under the action of external sources of ignition and/or d) a reduction in the flame propagation speed in the event of a fire and/or e) a reduction in the release of heat in the event of a fire and/or f) a reduction in the smoke density in the event of a fire.

The following examples serve to illustrate the invention in more detail.

EXAMPLES

A. Production and Characterization of the Oxalate Compounds

I. Magnesium Oxalate

Magnesium oxalate was produced by reacting an aqueous dispersion of magnesium hydroxide VI (e.g. Magnifin® from Martinswerk GmbH, Bergheim, Germany) with a stoichiometrically equivalent amount of an 8.2% aqueous oxalic acid solution. After the addition of the oxalic acid solution to the aqueous $Mg(OH)_2$ dispersion, the reaction mixture was stirred for 24 hours at room temperature and the solids were then filtered off and dried at 50° C. in vacuo to constant weight. The magnesium oxalate hydrate VII was obtained.

Component C

Styrene/acrylonitrile copolymer with a styrene/acrylonitrile weight ratio of 72:28 and an intrinsic viscosity of 0.55 dl/g (measured in dimethyl-formamide at 20° C.).

Component D.1

Basic aluminium oxalate BAO10 from ALCOA Industrial Chemicals, Bauxite, USA.

Component D.2

Talcum: Naintsch® A3 (Naintsch Mineralwerke GmbH, Graz, Austria)

Component E

Bisphenol A-based oligophosphate of the formula

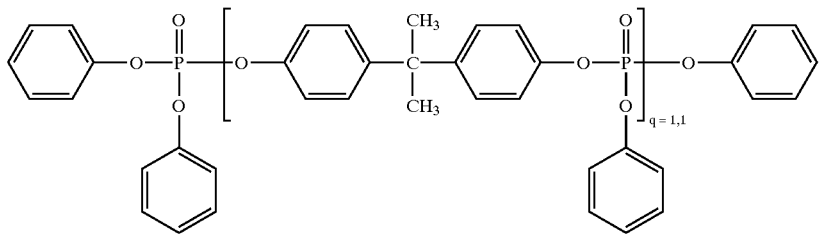

The magnesium oxalate dihydrate VIII is a commercial product obtainable from Dr. Paul Lohmann GmbH, Emmerthal, Germany.

The magnesium oxalate I was obtained by calcining the magnesium oxalate hydrate VII at 250° C. for 4 hours in a circulating air furnace. A magnesium oxalate that may be used in accordance with the invention was produced in a similar way from the magnesium oxalate dihydrate VIII.

II. Oxalate-modified Aluminium Hydroxide

A product identified as "BAO 10" (II) and commercially obtainable from Alcoa Industrial Chemicals, Bauxite, USA, was used.

TABLE 1

Properties of the oxalate compounds

| Substance | Peaks in DTA | Weight Loss at 300° C. [%] | Weight Loss at 600° C. [%] |
|---|---|---|---|
| V I | 425 | 0.2 | 28 |
| V II | 245/550 | 25 | 71 |
| V III | 190/490 | 25 | 73 |
| I | 500 | 4.3 | 65 |
| II | 400 | 1.3 | 51 |

B. Production and Testing of the Polymer Compositions

Compositions 1 to 3 (according to the invention) and V1 to V3 (comparison) were produced and the properties of articles molded therefrom are summarized in Table 2.

The individual components were compounded in a ZSK-25 machine at 240° C. The test specimens were produced in an Arburg 270 E injection molding machine at 240° C.

Component A

Linear polycarbonate based on bisphenol A having a relative solution viscosity of 1.24, measured in $CH_2Cl_2$ as solvent at 25° C. and at a concentration of 0.5 g/100 ml.

Component B

Graft polymer of 40 parts by weight of a copolymer of styrene and acrylonitrile in a ratio of 73:27 grafted on 60 parts by weight of particulate crosslinked polybutadiene rubber (median particle diameter $(d_{50})=0.3$ μm) produced by emulsion polymerization.

Component F

Tetrafluoroethylene polymer as a coagulated mixture of a SAN graft polymer emulsion according to component B mentioned above in water and a tetrafluoroethylene polymer emulsion in water. The weight ratio of the graft polymer B to the tetrafluoroethylene polymer E in the mixture is 90 wt. % to 10 wt. %. The tetrafluoroethylene polymer emulsion has a solids content of 60 wt. %, and the median particle diameter is between 0.05 and 0.5 μm. The SAN graft polymer emulsion has a solids content of 34 wt. % and a median latex particle diameter of $d_{50}=0.3$ μm.

The emulsion of the tetrafluoroethylene polymer (Teflon® 30 N) is mixed with the emulsion of the SAN graft polymer B and stabilized with 1.8 wt. %, referred to polymer solids, of phenolic antioxidants. The mixture is coagulated at 85° to 95° C. with an aqueous solution of $MgSO_4$ (Epsom salt) and acetic acid at pH 4 to 5, filtered and washed until practically free from electrolyte, then freed from the majority of the water by centrifugation and finally dried at 100° C. to form a powder.

Component G1

Pentaerythritol tetrastearate (PETS) as mold release agent.

Component G2

Phosphite stabiliser.

Testing of the Compositions According to the Invention

The determination of the weld line strength was carried out according to ISO 179/1eU by measuring the impact strength at the weld line of bilaterally side fed test specimens of size 80 mm×10 mm×4 mm.

The melt viscosity was measured at 260° C. and at a shear rate of 1,000 $s^{-1}$ according to DIN 54811.

The measurement of the Vicat B 120 thermal stability was carried out according to DIN 53 460 (ISO 306) on test rods of size 80 mm×10 mm×4 mm.

The stress-cracking behavior (ESC behavior) was investigated on test rods of size 80 mm×10 mm×4 mm. A mixture of 60 vol. % of toluene and 40 vol. % of isopropanol was used as test medium. The test specimens were subjected to a preliminary stretching by means of a circular template ($\epsilon_x$=preliminary stretching in percent) and stored at room temperature in the test medium. The stress-cracking behavior was evaluated from the crack formation and/or fracture as a function of the preliminary stretching in the test medium.

The notched impact strength ($a_k$) is determined according to ISO 180/1A at 23° C. The test rods are injection-molded at 240° C.

The fire behavior of the specimens was measured according to UL 94 V on test rods 1.2 mm thick.

A summary of the properties of the compositions according to the invention or molded articles obtained therefrom is given in Table 2.

TABLE 2

Composition and properties of the polymer compositions

| Composition/Components [wt. %] | 1 | V1 | 2 | V2 | 3 | V3 |
|---|---|---|---|---|---|---|
| A (polycarbonate) | 66.3 | 66.7 | 65.3 | 65.3 | 63.2 | 63.2 |
| B (graft polymer) | 7.1 | 7.1 | 7.0 | 7.0 | 4.9 | 4.9 |
| C (copolymer) | 6.1 | 6.1 | 6.0 | 6.0 | 4.9 | 4.9 |
| D1 (oxalate compound) | 0.5 | — | 2.0 | — | 9.8 | — |
| D2 (talcum) | — | — | — | 2.0 | — | 9.8 |
| E (oligophosphate) | 14.8 | 14.9 | 14.6 | 14.6 | 12.8 | 12.8 |
| F (anti-drip agent) | 4.7 | 4.7 | 4.6 | 4.6 | 3.9 | 3.9 |
| G1 (additive) | 0.4 | 0.4 | 0.4 | 0.4 | 0.4 | 0.4 |
| G2 (additive) | 0.1 | 0.1 | 0.1 | 0.1 | 0.1 | 0.1 |
| Properties: | | | | | | |
| $a_K$(notched impact [kJ/m²] | 47 (tough) | 47 (tough) | 37 (tough) | 17 (brittle) | 8 (brittle) | 10 (brittle) |
| $a_n$ (weld line) [kJ/m²] | 8 | 7 | 10 | 6 | 10 | 5 |
| Melt viscosity (260° C./ 1000s$^{-1}$) [Pa.s] | 158 | 155 | 149 | 151 | 162 | 161 |
| Vicat B 120 [° C.] | 95 | 96 | 97 | 95 | 99 | 99 |
| ESC behavior fracture at $\epsilon\chi$ after 5 mins [%] | 2.0 | 1.8 | 2.4 | 2.4 | 2.4 | 2.4 |
| UL 94 V at 1.2 mm (overall afterburning time [sec]) | V-2 (25 s) | V-2 (38 s) | V-0 (30 s) | V-0 (30 s) | V-0 (18 s) | V-0 (15 s) |

The results show that Example 1 according to the invention, containing 0.5 wt. % of oxalate compound, has compared to comparison Example V1 without the addition of oxalate, a significantly better ESC behavior, a significantly improved overall afterburning time in the UL 94 V test with a wall thickness of 1.2 mm, and a better weld line strength with comparably good processing properties (melt viscosity) and thermal stability (Vicat B 120).

Comparison Examples V2 and V3 differ from Examples 2 according to the invention in that these contain talcum instead of the oxalate compound as flame retarding synergist. The example according to the invention more specifically show a comparable behavior as regards flameproofing, ESC behavior, thermal stability heat resistance and flowability, but have a substantially better weld line strength.

A comparison of Example 2 with Example 1 shows that by adding 2 wt. % of the oxalate compound according to the invention, not only is the afterburning time in the UL 94 V test reduced, but also the tendency of the molding compositions to form droplets in this fire test may be suppressed (evaluation V-0 instead of V-2), and at the same time an improved ESC behavior as well as an improved weld line strength is achieved with an unchanged good thermal stability and flowability of the melt.

On comparing Examples 1 and 2 according to the invention with Comparison Example 3 it is found that the oxalate quantities according to the invention (0.5 and 2.0 parts by weight) do not or hardly have any negative effects on the impact strength properties of the test specimens whereas they already have positive effects on the weld line strength and the ESC behavior.

C. Impact-resistant Modified Polycarbonate Compositions Rendered Flameproof with Oxalate Compounds Example 3

Comparison Example 5

This example illustrates the use of oxalate compounds for flameproofing impact-resistant modified polycarbonate compositions, and represents a further aspect of the invention.

Example 3 80 parts by weight of the commercially available PC/ABS blend Bayblend® T 85 (Bayer AG, Leverkusen, Germany) were melt-compounded at 220° C. with 20 parts by weight of magnesium oxalate according to substance I in Table 1 in a 50 g internal kneader, following which the cooled molding composition was granulated and then processed at 200° C. into a compressed sheet (10 cm×10 cm) 2 mm thick. Comparison Example 5 was similarly made containing Bayblend® T 85 only. The melt volume index (MVR at 260° C./5 kg) was determined in the oxalate-containing compound (Example 3, according to the invention) and found to be 12.6 ml/10 min compared to 20.5 ml/10 min in the case of Bayblend® T 85 (comparison Example 3), from which it may be seen that the PC/ABS blend has withstood the compounding without undergoing decomposition. In the thermogravimetric analysis the oxalate-containing composition shows a weight loss of about 1 wt. % at 280° C., which is roughly in line with the decomposition of the oxalate compound I corresponding to its proportion in the molding composition. From this it follows that at conventional processing temperatures of PC/ABS molding compositions, the polymers in the oxalate-containing compositions do not exhibit any signs of decomposition.

The compressed sheets were clamped horizontally and flamed from underneath for 100 sec using a standard flame corresponding to the UL 94 V test.

In the case of the sheet fabricated from Bayblend® T 85 (comparison Example 5) a superficial charring was first of all observed, followed finally by the formation of perforations already during the flaming. The sheet continued to burn after removal of the external flame until the test specimen was completely destroyed.

In the case of the sheet of the oxalate-containing composition (Example 3), although there was a superficial foaming and charring, no perforations were formed. The flame extinguished itself without forming perforations in the test specimen, 45 seconds after the external source of ignition was removed.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising poly(ester)carbonate and at least one oxalate compound selected from the group consisting of metal oxalates, metal hydroxyoxalates, oxalic acid esters and metal salts of oxalic acid esters in amounts of 0.5 to 5 parts by weight (based on 100 parts by weight of the total composition), wherein the oxalate compound conforms to the general formula $$M^1_{x(1)}M^2_{x(2)} \ldots M^n_{x(n)}(OH)_a(C_2O_4)_b$$

wherein n is a running index and $M^1$, $M^2$ to $M^n$ denote identical or different metals of the same or different valencies, the variable b denotes an arbitrary number >0, and the variables a and x(1) to x(n) denote arbitrary numbers $\geq 0$, wherein at least one of the variables x(1) to x(n) has a value>0, and wherein $M^1$ to $M^n$ are selected from the group consisting of Li, Na, K, Rb, Cs, Be, Mq, Ca, Sr, Ba, B, Al, Ga, In and TI.

2. The composition according to claim 1, wherein $M^1$ to $M^n$ are selected from the group consisting of Al, Mg and Li.

3. The composition according to claim 1 wherein the ratio 2b/(a+2b) is 0.1 to 1.

4. The composition according to claim 3, wherein the ratio is 0.2 to 0.5.

5. The composition according to claim 1, wherein x(1)=1, x(2) to x(n)=0, $M^1$=Al, a=2 and b=0.5.

6. The composition according to claim 1 wherein the oxalate compound is contained in an amount of 0.1 to 4 parts by weight, the sum total of the parts by weight of the components in the composition being 100.

7. The composition according to claim 6, wherein the oxalate compound is contained in an amount of 0.3 to 3 parts by weight.

8. The composition according to claim 1 wherein the poly(ester)carbonate is polycarbonate and wherein it is contained in an amount of 20 to 95 parts by weight, the sum total of the parts by weight of the components in the composition being 100.

9. The composition according to claim 1 further comprising a graft polymer of 5 to 95 wt.% of at least one vinyl monomer grafted on 95 to 5 wt. % of at least one graft base having a glass transition temperature of less than about 10° C., the percents, both occurrences being relative to the weight of the graft polymer.

10. The composition according to claim 9, wherein the graft base is at least one rubber selected from the group consisting of diene, EP(D)M, acrylate and silicone.

11. The composition according to claim 9, wherein the graft polymer is contained in an amount of 1 to 40 parts by weight the sum total of the parts by weight of the components in the composition being 100.

12. The composition according to claim 1 further containing at least one member selected from the group consisting of thermoplastic vinyl (co)polymer and polyalkylene terephthalate.

13. The composition according to claim 12, wherein the member is contained in an amount of up to 30 parts by weight the sum total of the parts by weight of the components in the composition being 100.

14. The composition according to claim 1 further containing a halogen-free flame retardant.

15. The composition according to claim 14 containing compounds of the formula (IV)

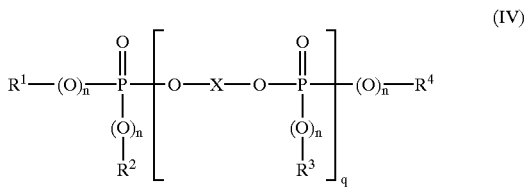

(IV)

wherein $R^1$, $R^2$, $R^3$ and $R^4$ independently of one another denote in each case optionally halogenated $C_1$ to $C_8$-alkyl, in each case optionally alkyl- and/or halogen-substituted $C_5$ to $C_6$-cycloalkyl, $C_6$ to $C_{20}$-aryl or $C_7$ to $C_{12}$-aralkyl, the n's independently of one another denote 0 or 1, q denotes 0 to 30 and X denotes a mono- or polynuclear aromatic radical having 6 to 30 C atoms or a linear or branched aliphatic radical having 2 to 30 C atoms, which is OH-substituted and can contain up to 8 ether bonds.

16. The composition according to claim 15, containing compounds of the formula (IVa)

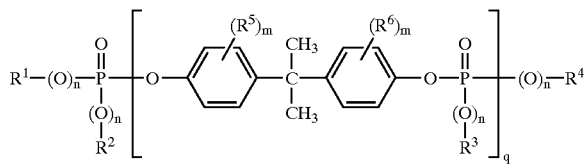

(IVa)

wherein $R^1$, $R^2$, $R^3$, $R^4$ and n have the meanings given for formula (IV), the m's, independently of one another, denote 0,1, 2, 3 or 4, $R^5$ and $R^6$ independently of one another denote $C_1$ to $C_4$-alkyl and q denotes 0.9 to 2.

17. The composition according to claim 15 wherein the flame retardant is contained in an amount of 0.5 to 30 parts by weight the sum total of the parts by weight of the components in the composition being 100.

18. The composition according to claim 1 wherein a fluorinated polyolefin is contained as further component.

19. The composition according to claim 18, wherein the fluorinated polyolefin is contained in an amount of 0.05 to 5 parts by weight the sum total of the parts by weight of the components in the composition being 100.

20. The composition according to claim 1 further containing at least one polymer additive selected from the group consisting of lubricants, mold release agents, nucleating agents, antistatics, stabilizers, fillers, reinforcing substances, dyes and pigments.

21. A molded article comprising the composition of claim 1.

22. A method of using an oxalate compound selected from the group consisting of metal oxalates, metal hydroxyoxalates, oxalic acid esters and metal salts of oxalic acid esters comprising incorporating said compound in a molding composition that contains poly(ester)carbonate.

23. A method of using an oxalate compounds in polycarbonate containing compositions to improve the weld line strength of said compositions.

* * * * *